United States Patent
Ljung

(10) Patent No.: US 9,686,670 B2
(45) Date of Patent: Jun. 20, 2017

(54) ELECTRONIC DEVICE WITH FREQUENCY BAND SCANNING ORDER

(71) Applicant: Sony Corporation, Tokyo (JP)

(72) Inventor: Rickard Ljung, Helsingborg (SE)

(73) Assignee: Sony Mobile Communications Inc., Tokyo (JP)

( * ) Notice: Subject to any disclaimer, the term of this patent is extended or adjusted under 35 U.S.C. 154(b) by 256 days.

(21) Appl. No.: 14/394,735

(22) PCT Filed: Dec. 20, 2013

(86) PCT No.: PCT/IB2013/061227
§ 371 (c)(1),
(2) Date: Oct. 15, 2014

(87) PCT Pub. No.: WO2015/092495
PCT Pub. Date: Jun. 25, 2015

(65) Prior Publication Data
US 2016/0269888 A1   Sep. 15, 2016

(51) Int. Cl.
*H04W 4/00* (2009.01)
*H04W 8/08* (2009.01)
*H04W 48/16* (2009.01)

(52) U.S. Cl.
CPC ............ *H04W 8/08* (2013.01); *H04W 48/16* (2013.01)

(58) Field of Classification Search
CPC .................................. H04W 8/08; H04W 48/16
USPC .... 455/434, 435.2, 435.1, 435.3, 456.3, 515
See application file for complete search history.

(56) References Cited

U.S. PATENT DOCUMENTS

| | | | | |
|---|---|---|---|---|
| 6,324,400 | B1 * | 11/2001 | Shah | H04W 48/18 455/426.1 |
| 7,167,707 | B1 * | 1/2007 | Gazzard | H04W 48/18 455/434 |
| 7,606,741 | B2 * | 10/2009 | King | H04N 1/00244 235/379 |
| 7,689,218 | B2 | 3/2010 | Jiang | |
| 8,219,080 | B2 | 7/2012 | Sokondár | |
| 8,229,499 | B2 | 7/2012 | Yoon | |
| 8,538,428 | B2 | 9/2013 | Bartlett | |
| 8,554,206 | B2 | 10/2013 | Bocking | |
| 8,560,008 | B2 | 10/2013 | Islam | |

(Continued)

FOREIGN PATENT DOCUMENTS

| | | |
|---|---|---|
| EP | 1740001 A1 | 1/2007 |
| EP | 1968283 A1 | 9/2008 |
| WO | 99/01001 A1 | 1/1999 |

OTHER PUBLICATIONS

International Search Report and Written Opinion from corresponding International Application No. PCT/IB2013/061227, mailed on Oct. 2, 2014.

*Primary Examiner* — Marceau Milord
(74) *Attorney, Agent, or Firm* — Renner, Otto, Boisselle & Sklar, LLP

(57) ABSTRACT

Locally available location data is analyzed to identify a country or region of the world in which an electronic device (10) is most likely being used. From the identified country or region, the electronic device configures a band scan order for a prioritized full band scan of channels supported by the electronic device. As part of the configuration, the electronic device places the frequencies most likely to be used for radio access technology in the identified country or region at the beginning of the band scan order.

16 Claims, 3 Drawing Sheets

(56) References Cited

U.S. PATENT DOCUMENTS

| | | | |
|---|---|---|---|
| 8,670,761 B2* | 3/2014 | Ramkull | H04W 48/16 455/432.1 |
| 9,066,279 B2* | 6/2015 | Sami | H04W 36/24 |
| 2007/0268877 A1 | 11/2007 | Buckley et al. | |
| 2010/0136969 A1 | 6/2010 | Nader | |
| 2011/0003590 A1* | 1/2011 | Yoon | H04W 36/385 455/432.1 |
| 2011/0075228 A1* | 3/2011 | King | G06Q 30/06 358/483 |
| 2011/0305192 A1 | 12/2011 | Faccin | |
| 2012/0083268 A1 | 4/2012 | Lung | |
| 2012/0164425 A1 | 6/2012 | Ruckdaeschel | |
| 2012/0184289 A1 | 7/2012 | Wang | |
| 2012/0264425 A1 | 10/2012 | Krishnamoorthy et al. | |

* cited by examiner

ELECTRONIC DEVICE WITH FREQUENCY BAND SCANNING ORDER

TECHNICAL FIELD OF THE INVENTION

The technology of the present disclosure relates generally to electronic devices and, more particularly, to an electronic device that changes an order in which frequency bands are scanned based on locally-stored location data.

BACKGROUND

An electronic device for mobile communications (sometimes referred to as a terminal), such as a mobile telephone, may support wireless communications on plural radio frequency bands (also referred to as channels) for the same radio access technology. The electronic device also may support multiple radio access technologies, in which case the electronic device may support one or more frequency bands for each of the supported radio access technologies. Typically, not all supported bands are used simultaneously. Rather, the electronic device is configured to switch to a desired frequency band using one or both of software or hardware tuning technologies. The total number of bands supported in current electronic devices is typically about 10, but this number will vary depending on the specific electronic device, the manufacturer, the supported radio access technologies, etc. Exemplary cellular radio access technologies include, but are not limited to, GSM, CDMA, and WCDMA, and exemplary packet-switched network radio access technologies include, but are not limited to, WiFi and WiMAX.

There are some situations where an electronic device is power on and does not have stored data regarding a default network (also referred to as a home network) with which to attempt to communicate or cannot find a default network after attempting to communicate on channels associated with the default network. This may occur when the device is powered on for the first time and has not yet been affiliated with a subscriber network, when a subscriber identity module (SIM) card is changed (or added), or when travelling outside the coverage area of the home network. In this event, the electronic device starts a scan procedure in which each supported channel is scanned to identify a preferred network with which to communicate. This is often referred to as a full band scan. Full band scanning can take up to several minutes to complete scanning of each supported channel, although the scanning may be interrupted if a certain condition occurs such as identifying a preferred network or by finding another suitable radio access network. Typically, the scan involves scanning each supported channel in a serial manner (one after another) and in a default order.

Currently, the scan order for a full band scan is dictated by a specific register or part of the device's memory that stores the scan order. It is possible, in some cases, to reprogram that order but it is not convenient and requires a high level of knowledge to construct an order that would lead to scanning the lowest possible number of channels before reaching a satisfactory interruption point.

SUMMARY

Disclosed is an approach to full band scanning that attempts to reduce the scan time by optimizing the band scan order. In some cases, scan time to find a suitable network may be reduced by minutes. In embodiment of the technique involves analyzing subscription information available on the SIM card that is inserted into the electronic device. The subscription information obtained from the SIM card may include location data. This data is used to identify a country or region of the world in which the electronic device is most likely being used. From the identified country or region, the electronic device configures the band scan order. As part of the configuration, the electronic device places the frequencies most likely to be used for radio access technology in the identified country or region at the beginning of the band scan order.

According to one aspect of the disclosure, an electronic device includes a radio circuit that establishes wireless communications over a connection with a network, the radio circuit supports communications over plural supported radio frequency bands; and a control circuit (20) that controls the electronic device to carry out a full band scan by scanning the supported radio frequency bands in a prioritized scan order, the control circuit determines the prioritized scan order for the full band scan by executing logic to: ascertain a locally-stored location value; and prioritize the order of the supported radio frequency bands by identifying bands associated with the locally-stored location value from a data structure stored by the electronic device, the associated bands placed at the beginning of the prioritized scan order and other supported radio frequency bands following the associated bands in the prioritized scan order.

According to one embodiment of the electronic device, the locally-stored location value is a mobile country code (MCC) obtained from a subscriber identity module (SIM) card of the electronic device.

According to one embodiment of the electronic device, the locally-stored location value refers to a region of the world.

According to one embodiment of the electronic device, the locally-stored location value refers to a country.

According to one embodiment of the electronic device, the control circuit further determines the prioritized scan order for the full band scan by executing logic to include a channel used for a last connection to a network in the beginning of the prioritized scan order.

According to one embodiment of the electronic device, the control circuit further executes logic to store the prioritized scan order in a configuration file in a memory of the electronic device.

According to one embodiment of the electronic device, the control circuit further executes logic to revise the stored prioritized scan order by moving a channel used to establish network connection following the full band scan up in the prioritized scan order.

According to one embodiment of the electronic device, the electronic device further includes a first SIM card storing a first MCC and a second SIM card storing a second MCC, the first MCC having priority over the second MCC, and wherein the logic to prioritize the order of the supported radio frequency bands places bands associated with the first MCC at the beginning of the prioritized scan order, bands associated with the second MCC after the bands associated with the first MCC in the prioritized scan order, and other supported radio frequency bands following the bands associated with the second MCC in the prioritized scan order.

According to another aspect of the disclosure, a method of establishing wireless communications over a connection with a network in an electronic device, the electronic device including a radio circuit that supports communications over plural supported radio frequency bands, includes creating a prioritized scan order for a full band scan, including ascertaining a locally-stored location value; and prioritizing the order of the supported radio frequency bands by identifying bands associated with the locally-stored location value in a data structure stored by the electronic device, the associated bands placed at the beginning of the prioritized scan order and other supported radio frequency bands following the associated bands in the prioritized scan order; and carrying out the full band scan by scanning the supported radio frequency bands in the prioritized scan order.

According to one embodiment of the method, the locally-stored location value is a mobile country code (MCC) obtained from a subscriber identity module (SIM) card (56) of the electronic device.

According to one embodiment of the method, the locally-stored location value refers to a region of the world.

According to one embodiment of the method, the locally-stored location value refers to a country.

According to one embodiment of the method, the prioritized scan order includes a channel used for a last connection to a network in the beginning of the prioritized scan order.

According to one embodiment, the method further includes storing the prioritized scan order in a configuration file in a memory (30) of the electronic device.

According to one embodiment, the method further includes revising the stored prioritized scan order by moving a channel used to establish network connection following the full band scan up in the prioritized scan order.

According to one embodiment of the method, the electronic device further includes a first SIM card storing a first MCC and a second SIM card storing a second MCC, the first MCC having priority over the second MCC, and wherein the prioritizing the order of the supported radio frequency bands places bands associated with the first MCC at the beginning of the prioritized scan order, bands associated with the second MCC after the bands associated with the first MCC in the prioritized scan order, and other supported radio frequency bands following the bands associated with the second MCC in the prioritized scan order.

DETAILED DESCRIPTION OF EMBODIMENTS

Figure 1:
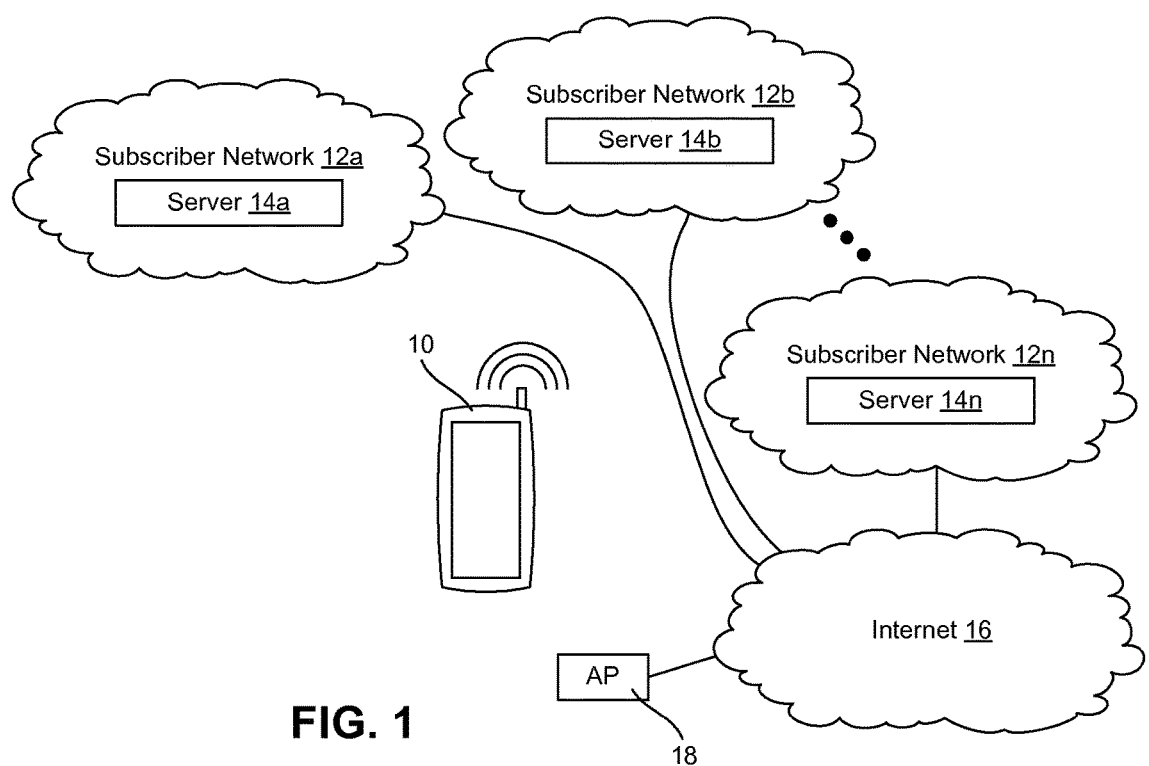
FIG. 1 is a schematic view of a communication system that includes an electronic device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of an electronic device and method of controlling the electronic device. The electronic device is typically a portable electronic device, and may take any form factor including, but not limited to, a tablet computing device, a mobile telephone, a laptop computer, a gaming device, a camera, a television, and a media player. The illustrated examples show a mobile telephone, but applicability of aspects of the invention is not limited to mobile telephones.

Referring to FIG. 1, schematically shown is a communications environment for an electronic device 10. In the communications environment, the electronic device 10 may carry out wireless communications. To conduct wireless communications, the electronic device 10 establishes network connectivity with one or more networks. Typically, the connection is made to one of several available subscriber networks 12 that services the physical geo-location of the electronic device 10. One of the networks 12 may be a home network with which the electronic device 10 is provisioned to operate. But, in some situations, the home network may not be available in the physical geo-location of the electronic device 10. In that situation, the electronic device 10 may be placed in a roaming mode and communicate through a network other than the home network.

In the illustrated environment, the networks 12 are labeled as networks 12a through 12n. In most cases, the networks 12 are cellular networks operated by respective cellular service telephone companies. Exemplary network access technologies for the networks 12 are typically cellular circuit-switched network technologies and include, but are not limited to, global system for mobile communications (GSM), code division multiple access (CDMA), wideband CDMA (WCDMA), and advanced or alternative versions of these standards. The networks may support general packet radio service (GPRS), universal mobile telecommunications system (UMTS), 3G, 4G long-term evolution (LTE), or other standards. The networks 12 support communications such as, but not limited to, voice communications (e.g., telephone calls), video communications (e.g., video telephony), messaging (e.g., instant messaging, text and multimedia messaging, and electronic mail messaging), data transfers, and Internet browsing. To support the communications activity of the electronic device 10, each network 12 may include a server 14 (or servers), respectively labeled as severs 14a through 14n. Each server 14 may be configured as a typical computer system used to carry out server functions and may include a processor configured to execute software containing logical instructions that embody the functions of the server 14 and a memory to store such software and related data.

The communications between the electronic device 10 and an appropriate one of the subscriber networks 12 may be established by way of a transmission medium (not specifically illustrated) of the subscriber network 12. The transmission medium may be any appropriate device or assembly, but is typically an arrangement of communications base stations (e.g., cellular service towers, also referred to as "cell" towers).

In some situations, the electronic device 10 may communicate with the Internet 16 via an access point 18 of a local area network (LAN) using a packet-switched protocol, such as IEEE 802.11a, IEEE 802.11b, IEEE 802.11g or IEEE 802.11n (commonly referred to as WiFi). Other LAN-based protocols are possible. The access point 18 is typically, but not necessarily, a wireless router.

Figure 2:
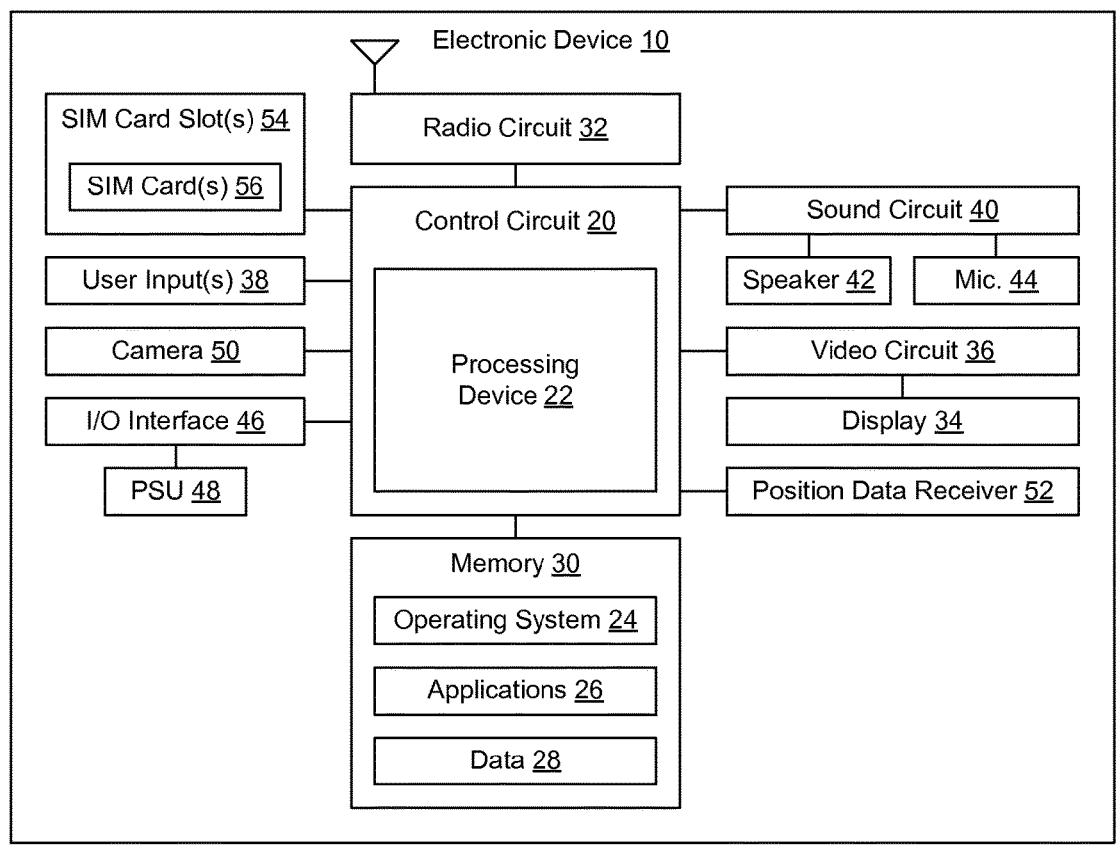
FIG. 2 is a schematic block diagram of the electronic device.

With additional reference to FIG. 2, a schematic block diagram of the electronic device 10 is illustrated. The electronic device 10 includes a control circuit 20 that is responsible for overall operation of the electronic device 10. For this purpose, the control circuit 10 includes a processor 22 that executes an operating system 24 and various applications 26. The operating system 24 and the applications 26, together with stored data 28 associated with the operating system 24, the applications 26 and user files, are stored on a memory 30. In one embodiment, the described full band scan functions may be embodied as part of the operating system 24, as an application 26, or part of a BIOS. The operating system 24 and applications 26 are embodied in the form of executable logic routines (e.g., lines of code, software programs, etc.) that are stored on a non-transitory computer readable medium (e.g., the memory 30) of the electronic device 10 and are executed by the control circuit 20. The described operations may be thought of as a method that is carried out by the electronic device 10.

The processor 22 of the control circuit 20 may be a central processing unit (CPU), microcontroller, or microprocessor. The processor 22 executes code stored in a memory (not shown) within the control circuit 22 and/or in a separate memory, such as the memory 30, in order to carry out operation of the electronic device 10. The memory 30 may be, for example, one or more of a buffer, a flash memory, a hard drive, a removable media, a volatile memory, a non-volatile memory, a random access memory (RAM), or other suitable device. In a typical arrangement, the memory 30 includes a non-volatile memory for long term data storage and a volatile memory that functions as system memory for the control circuit 20. The memory 30 may exchange data with the control circuit 20 over a data bus. Accompanying control lines and an address bus between the memory 30 and the control circuit 20 also may be present. The memory 30 is considered a non-transitory computer readable medium.

The electronic device 10 includes communications circuitry that enables the electronic device 10 to establish the communication connections that are described above. In the exemplary embodiment, the communications circuitry includes a radio circuit 32. The radio circuit 32 includes one or more radio frequency transceivers and an antenna assembly (or assemblies). Since the electronic device 10 is a multi-mode device capable of communicating using more than one standard and over more than one radio frequency band, the radio circuit 32 represents one or more than one radio transceiver, one or more than one antenna, tuners, impedance matching circuits, and any other components needed for the various supported frequency bands and radio access technologies. The radio circuit 32 further represents any radio transceivers and antennas used for local wireless communications directly with an electronic device, such as over a Bluetooth interface.

The electronic device 10 further includes a display 34 for displaying information to a user. The display 34 may be coupled to the control circuit 20 by a video circuit 36 that converts video data to a video signal used to drive the display 34. The video circuit 36 may include any appropriate buffers, decoders, video data processors and so forth.

The electronic device 10 may include one or more user inputs 38 for receiving user input for controlling operation of the electronic device 10. Exemplary user inputs include, but are not limited to, a touch input that overlays the display 26 for touch screen functionality, one or more buttons, motion sensors (e.g., gyro sensors, accelerometers), and so forth.

The electronic device 10 may further include a sound circuit 40 for processing audio signals. Coupled to the sound circuit 40 are a speaker 42 and a microphone 44 that enable a user to listen and speak via the electronic device 10, and hear sounds generated in connection with other functions of the device 10. The sound circuit 40 may include any appropriate buffers, encoders, decoders, amplifiers and so forth.

The electronic device 10 may further include one or more input/output (I/O) interface(s) 46. The I/O interface(s) 46 may be in the form of typical electronic device I/O interfaces and may include one or more electrical connectors for operatively connecting the electronic device 10 to another device (e.g., a computer) or an accessory (e.g., a personal handsfree (PHF) device) via a cable. Further, operating power may be received over the I/O interface(s) 46 and power to charge a battery of a power supply unit (PSU) 48 within the electronic device 10 may be received over the I/O interface(s) 46. The PSU 48 may supply power to operate the electronic device 10 in the absence of an external power source.

The electronic device 10 also may include various other components. For instance, a camera 50 may be present for taking digital pictures and/or movies. Image and/or video files corresponding to the pictures and/or movies may be stored in the memory 30. As another example, a position data receiver 52, such as a global positioning system (GPS) receiver, may be present to assist in determining the location of the electronic device 10.

The electronic device 10 also may include a SIM card slot 54 in which a SIM card 56 is received. The slot 54 includes any appropriate connectors and interface hardware to establish an operative connection between the electronic device 10 and the SIM card 56. The SIM card 56 may store items of information, such as one or more of a unique serial number (e.g., an integrated circuit card identifier or ICCID), an international mobile subscriber identity (IMSI), security authentication and ciphering information, temporary information related to a local network, a list of the services the user has access to, password data, etc. The IMSI contains a mobile country code (MCC), a mobile network code (MNC) and a mobile subscription identification number (MSIN). The uses and purposes of these items of information will be understood to those of ordinary skill in the art and will not be explained in detailed herein. In some cases, it is possible that no SIM card is present. In other cases, it is possible that two SIM cards 56 are presented in the electronic device 10.

Figure 3:
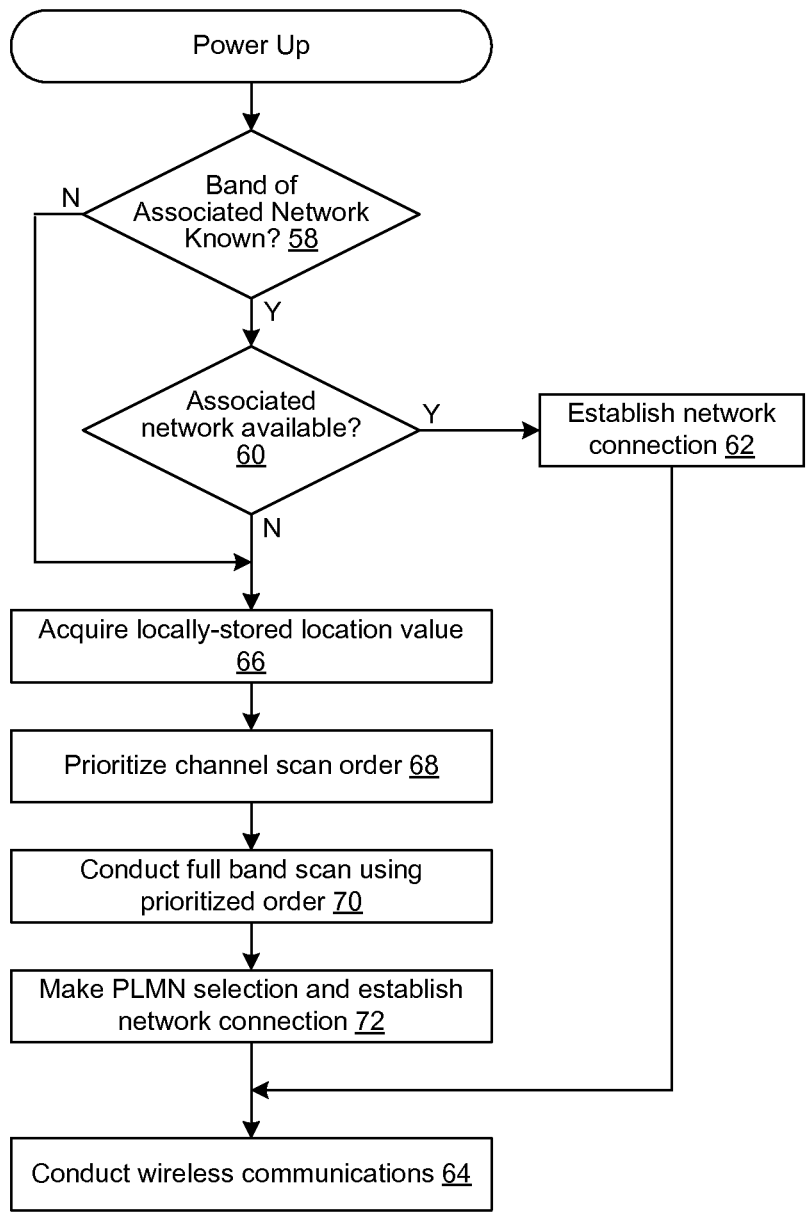
FIG. 3 is a flow diagram of full band scanning operations of the electronic device.

With additional reference to FIG. 3, illustrated is an exemplary flow diagram representing steps that may be carried out to implement full band scanning by the electronic device 10. Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow typically commences when the electronic device 10 is powered on, but also may be carried out in other circumstances. One of the operations performed at power up, as shown in decision block 58, is to determine if the electronic device 10 stores one or more known operating frequency bands of a network associated with the electronic device 10 (e.g., a default or home network). The associated network may be a home network operated by a service provider with whom the user of the electronic device 10 has an agreement for network access or a service provider that sold or supports the SIM card 56 that is inserted into the electronic device 10. The home network may be one of the networks 12 (FIG. 1). If an operating band is known in block 58, the logical flow may proceed to block 60. In block 60, the electronic device determines if the associated network is available.

The determination in block 60 may be made after scanning one or more channels used by the associated network. If the electronic device 10 identifies the associated network a positive determination may be made in block 60 and the logical flow may proceed to block 62. In block 62, the electronic device 10 establishes a network connection with the associated network. Then, in block 64, the electronic device 10 conducts wireless communications in the ordinary manner.

A negative determination may be made in one of block 58 or block 60 if the electronic device 10 cannot find the associated network or does not have stored data (in the SIM card 56 or memory 30) regarding a home network. This may occur for at least one of several reasons such as when the electronic device is powered on for the first time and has not yet been affiliated with a subscriber network, when the SIM card 56 has been changed or newly added to the electronic device 10, or when the electronic device 10 is physically located outside the coverage area of the associated network.

Following a negative determination in block 58 or block 60, the logical flow may proceed to block 66. In block 66, a locally-stored location value is acquired. The location value may be stored in the SIM card 56. In one embodiment, the location value is the MCC that forms part of the IMSI. In other embodiments, the locally-stored location value may be stored by the memory 30.

In block 68, a channel scan order for a full band scan is prioritized using the location value. In one embodiment, the locally-stored location value is used to determine a region of the world in which the SIM card has its home network, the home network typically referred to as a home public land mobile network (PLMN). PLMNs in different regions typically use a predictable set of channels for primary operation. Therefore, under the assumption that the electronic device 10 is most likely to be physically located in the same region of the world as the region derivable from the locally-stored location value, the channels most commonly used by PLMNs in the determined region and supported by the electronic device may be placed at the beginning of the prioritized channel scan order and other channels supported by the electronic device may in the prioritized channel scan order. All channels that are supported by the electronic device 10 are present in the prioritized scan order. That is, no supported channels are eliminated from the full band scan. In this manner, even if the electronic device 10 is not physically present in the region of the world corresponding to the locally-stored location value, the full band scan should still result in identification of a suitable network.

Table 1 shows an exemplary look-up table to implement an embodiment of using an MCC from a SIM card to determine the most commonly used channels by PLMNs in each of several regions of the world and that are supported by the electronic device 10. The look-up table may be stored locally by the electronic device 10, such as in the memory 30, and is a representative data structure from which bands associated with the locally-stored location value may be identified.

TABLE 1

| MCC Starting Value | Region of the World | Priority Bands Based on PLMN Channel Use in Region |
|---|---|---|
| 2 | Europe | 7, 3, 20 |
| 3 | Canada, United States and Central America | 4, 13, 17, 2, 5 |
| 4 | Asia | 3, 1, 40 |
| 5 | Southeast Asia and Australia | 3, 1, 40 |
| 6 | Africa | 3, 7, 20 |

In this embodiment of using a look-up table, the beginning value of the MCC is determined. As indicated in table 1, the beginning value represents a region of the world. From the determine region value, corresponding channels from the look-up table are determined. These determined channels are then placed at the beginning of the prioritized channel scan order for a full band scan. Any other supported channels follow the determined channels in the prioritized scan order. In one implementation of this approach, the channels for each region in the look-up table are placed in a preferred order for scanning. This order may be predetermined based on characteristics of the electronic device 10 or other known preferences. Other supported channels may follow in a default or prioritized order. In another implementation, the look-up table contains a scan order for each channel supported by the electronic device 10. In this embodiment, the channels known to be used by PLMNs in the corresponding region are still placed at the beginning of the prioritized scan order.

In a variation, the full MCC value is analyzed to determine a specific country for the home PLMN of the electronic device. In this case, the look-up table contains priority channels to be placed at the beginning of the prioritized scan order on a country-by-country basis.

The prioritized scan order may be saved to a configuration file in the memory 30. The file may be, for example, an encrypted file system (EFS) file. In one embodiment, the file may be prepared by the electronic device 10 when connected to a home PLMN and stored for future use in case negative determination is made in block 60 at some point in the future. In another embodiment, the file is prepared and stored the first time the electronic device 10 experiences a negative determination in block 60. When using a stored file under these approaches, blocks 66 and 68 may have already been carried out in the event of a future negative determination in block 60, thereby expediting full band scanning. If a new SIM card is inserted into the electronic device 10, the configuration file may be considered obsolete and a new configuration file may be generated using the techniques described herein.

The file containing the prioritized scan order may be static (e.g., not subject to future change or editing). In another embodiment, the file containing the prioritized scan order may be revised based on a learning routine. For example, following a full band scan where the electronic device 10 establishes network connection to a network 12 using a channel that is not the first channel in the prioritized scan order, the channel used for the network connection may be moved up in the prioritized scan order for the country or region. Another change to the prioritization scan order may be to move a last utilized frequency band up in the prioritized scan order. In one embodiment, the last utilized frequency band may be made the first entry in the prioritized scan order under the possibility that the last network with which the electronic device 12 established communications is still available. Channels also may be moved down in the priority scan order. For instance, a channel may be moved down if that channel was previously moved up in the scan order but more current scanning reveals that there is no suitable network on that channel.

Once a prioritized scan order is established in block 68, the logical flow may proceed to block 70 where the full band scan is carried and to block 72 where a network 12 is selected. The electronic device 10 will attempt to make a network connection with the selected network 12. During these operational blocks, the prioritized scan order is used as an input to the full band scan function so that the channels are scanned in the order set forth in the prioritized scan order. As is conventional, the full band scan may be interrupted if a suitable network is identified during the scanning.

If the full band scan is not interrupted in this manner, all channels supported by the electronic device 10 will be scanned. Also, the disclosed approach of establishing the scanning order does not change any default approach to prioritizing which detected network 12 to select (e.g., selecting among networks 12 that support one or more of 2G, 3G, 4G LTE, etc.). For instance, at the conclusion of the full band scan, if two or more suitable networks 12 are identified, then a selection process may be employed select one of the identified networks with which to attempt to establish a network connection.

Following block 72, the logical flow may proceed to block 64 where the electronic device 10 carries out wireless communications using the network connection.

Some adaptations to the techniques for establishing a prioritized scan order may be made in certain circumstances. One circumstance may be when two SIM cards 56 are present in the electronic device 10. In one embodiment, the MCC values of the SIM cards 56 are compared. If the MCC values are the same, no change in the prioritization of the scan order may be made. If the MCC values are different, then one SIM card slot 54 may have higher priority over the other of the SIM card slots 54. Channels corresponding to the MMC value of the SIM card 56 in the SIM card slot 54 with higher priority may be placed at the beginning of the priority scan order. Channels corresponding to the MCC value of the other SIM card 56 and not already entered into the priority scan order may be placed next in the priority scan order. Then, following the channels corresponding to the MCC values of the SIM cards 56, the priority scan order may be populated with the remaining supported channels.

If no SIM card 56 is present (or in embodiments where the locally-stored location value is stored by memory 30 but the locally-stored location value is unavailable), then a default scan order may be used for full band scanning.

Although certain embodiments have been shown and described, it is understood that equivalents and modifications falling within the scope of the appended claims will occur to others who are skilled in the art upon the reading and understanding of this specification.

What is claimed is:

1. An electronic device, comprising:
   a radio circuit that establishes wireless communications over a connection with a network, the radio circuit supports communications over plural supported radio frequency bands; and
   a control circuit that controls the electronic device to carry out a full band scan by scanning the supported radio frequency bands in a prioritized scan order, the control circuit determines the prioritized scan order for the full band scan by executing logic to:
   ascertain a locally-stored location value; and
   prioritize the order of the supported radio frequency bands by identifying bands associated with the locally-stored location value from a data structure stored by the electronic device, the associated bands placed at the beginning of the prioritized scan order and other supported radio frequency bands following the associated bands in the prioritized scan order.

2. The electronic device of claim 1, wherein the locally-stored location value is a mobile country code (MCC) obtained from a subscriber identity module (SIM) card of the electronic device.

3. The electronic device of claim 1, wherein the locally-stored location value refers to a region of the world.

4. The electronic device of claim 1, wherein the locally-stored location value refers to a country.

5. The electronic device of claim 1, wherein the control circuit further determines the prioritized scan order for the full band scan by executing logic to include a channel used for a last connection to a network in the beginning of the prioritized scan order.

6. The electronic device of claim 1, wherein the control circuit further executes logic to store the prioritized scan order in a configuration file in a memory of the electronic device.

7. The electronic device of claim 6, wherein the control circuit further executes logic to revise the stored prioritized scan order by moving a channel used to establish network connection following the full band scan up in the prioritized scan order.

8. The electronic device of claim 1, wherein the electronic device further includes a first SIM card storing a first MCC and a second SIM card storing a second MCC, the first MCC having priority over the second MCC, and wherein the logic to prioritize the order of the supported radio frequency bands places bands associated with the first MCC at the beginning of the prioritized scan order, bands associated with the second MCC after the bands associated with the first MCC in the prioritized scan order, and other supported radio frequency bands following the bands associated with the second MCC in the prioritized scan order.

9. A method of establishing wireless communications over a connection with a network in an electronic device, the electronic device including a radio circuit that supports communications over plural supported radio frequency bands, comprising:
   creating a prioritized scan order for a full band scan, including:
      ascertaining a locally-stored location value; and
      prioritizing the order of the supported radio frequency bands by identifying bands associated with the locally-stored location value in a data structure stored by the electronic device, the associated bands placed at the beginning of the prioritized scan order and other supported radio frequency bands following the associated bands in the prioritized scan order; and
   carrying out the full band scan by scanning the supported radio frequency bands in the prioritized scan order.

10. The method of claim 9, wherein the locally-stored location value is a mobile country code (MCC) obtained from a subscriber identity module (SIM) card of the electronic device.

11. The method of claim 9, wherein the locally-stored location value refers to a region of the world.

12. The method of claim 9, wherein the locally-stored location value refers to a country.

13. The method of claim 9, further comprising changing the prioritized scan order to include a channel used for a last connection to a network in the beginning of the prioritized scan order.

14. The method of claim 9, further comprising storing the prioritized scan order in a configuration file in a memory of the electronic device.

15. The method of claim 14, further comprising revising the stored prioritized scan order by moving a channel used to establish network connection following the full band scan up in the prioritized scan order.

16. The method of claim 9, wherein the electronic device further includes a first SIM card storing a first MCC and a second SIM card storing a second MCC, the first MCC having priority over the second MCC, and wherein the prioritizing the order of the supported radio frequency bands places bands associated with the first MCC at the beginning of the prioritized scan order, bands associated with the second MCC after the bands associated with the first MCC in the prioritized scan order, and other supported radio frequency bands following the bands associated with the second MCC in the prioritized scan order.

* * * * *